(12) United States Patent  (10) Patent No.: US 7,109,594 B2
Liao  (45) Date of Patent: Sep. 19, 2006

(54) CORD REEL BOX WITH RECHARGING UNIT

(76) Inventor: Sheng Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 433 days.

(21) Appl. No.: 10/791,774

(22) Filed: Mar. 4, 2004

(65) Prior Publication Data

US 2005/0194852 A1    Sep. 8, 2005

(51) Int. Cl.
*H02K 7/116*    (2006.01)
(52) U.S. Cl. ........................................ 290/1 C; 290/1 E
(58) Field of Classification Search ................ 290/1 C, 290/1 E
See application file for complete search history.

(56) References Cited

U.S. PATENT DOCUMENTS 4,639,654 A * 1/1987 Braxton et al. ................. 322/1
5,363,445 A * 11/1994 Shyu ...................... 379/433.11
5,796,047 A * 8/1998 Sheng-Hsin ................. 174/135
6,059,081 A * 5/2000 Patterson et al. ......... 191/12.2 R
6,127,803 A * 10/2000 Wang et al. ................. 320/114
6,316,906 B1 * 11/2001 Lozada ........................ 320/101
6,619,449 B1 * 9/2003 Liao ....................... 191/12.2 R
6,858,951 B1 * 2/2005 Liao ............................ 290/1 C

FOREIGN PATENT DOCUMENTS

EP    762047 A1 *  3/1997

* cited by examiner

*Primary Examiner*—Joseph Waks
(74) *Attorney, Agent, or Firm*—Rosenberg, Klein & Lee

(57) ABSTRACT

A cord reel box with recharging unit has a housing, a rotating plate, a volute spring, a communication cord, a recharging unit, and a pressing device. The gear mechanism is assembled between the rotating plate and the regenerator. The pressing device is pivotally mounted on one side of the housing. The gear mechanism is assembled between the pressing device and the regenerator. An AC plug is mounted on the housing and electrically connecting with the PCB. The PCB has a transformer mounted thereon, and the communication cord electrically connects with the PCB. The cord reel box can recharge a cell phone via the recharging unit or plug with the AC plug.

11 Claims, 17 Drawing Sheets

CORD REEL BOX WITH RECHARGING UNIT

BACKGROUND OF THE INVENTION

1. Field of the Invention

The present invention relates to a cord reel box with recharging unit, and particularly to a cord reel box combined with a recharging unit not only for extending and rewinding a communication cord, but also for generating or recharging electric power while pulling the communication cord or by pressing a handle.

2. Description of the Prior Art

Use of any communication device, such as a computer, modem, telephone, or a fax machine, requires connection of a proper communication cord for transmission of electrical messages. Several types of cord reeling devices exist to allow such a communication cord to be sufficiently long for practical use while avoiding entanglement of the same. The cord reeling device basically comprises a housing, a communication cord, a rotating plate and a volute spring. A connector of the communication cord can thus connect with an associated communication device for providing transmission. The volute spring is coiled on the rotating plate to retract the cord.

Additionally, to avoid the spring winding the communication cord too tightly in the cord reeling device such that the extended length thereof cannot remain constant, the inventor also discloses a cord reeling device with cord-fixing function. A switching plate mates with a cutout formed on a periphery of the housing of the reeling box and a hooking slot for fixing the communication cord after the same is extracted.

However, the cord reeling device only can retract cord, but cannot recharge and provide electrical power. The use of the cord reeling device is thus limited so as to have no other uses.

SUMMARY OF THE INVENTION

It is an object of the present invention to provide a cord reel box with a recharging unit, particular to a cord reel box that not only can retract a communication cord, but also can provide electric power to a communication device, such as a mobile phone, by regenerating itself or by connecting with AC electric power.

It is a further object of the invention to provide a cord reel box with recharging unit having a recharging unit for generating electric power when dragging the communication cord or pressing a pressing device.

In order to achieve the above objects, the present invention according to one aspect thereof provides a reel box with recharging unit having a housing formed with a cavity therein and a rotating plate pivotally mounted in the cavity. A volute spring is mounted between the housing and the rotating plate. A communication cord is wound on the rotating plate, and one end of the communication cord passes through the housing. A recharging unit is mounted in the housing and has a gear mechanism and a regenerator. The gear mechanism is assembled between the rotating plate and the regenerator. A pressing device is pivotally mounted on one side of the housing. The gear mechanism is assembled between the pressing device and the regenerator. An AC plug is mounted on the housing and electrically connecting with a PCB disposed in the housing. The PCB has a transformer mounted thereon, and the communication cord electrically connects with the PCB. When pulling the communication cord, the rotating plate rotates and drives the regenerator via the gear mechanism for producing electric power. Alternatively, when pressing the pressing device, the pressing device drives the regenerator via the gear mechanism for producing electric power. Electric power can also be input via the AC plug.

BRIEF DESCRIPTION OF THE DRAWINGS

Other objects, advantages and novel features of the present invention will become more apparent from the following detailed description of the present embodiment when taken in conjunction with the accompanying drawings, in which:

FIG. 16 is a perspective view of the second embodiment of the present invention with a mobile phone plugged in.

DESCRIPTION OF THE PREFERRED EMBODIMENT

Figure 1:
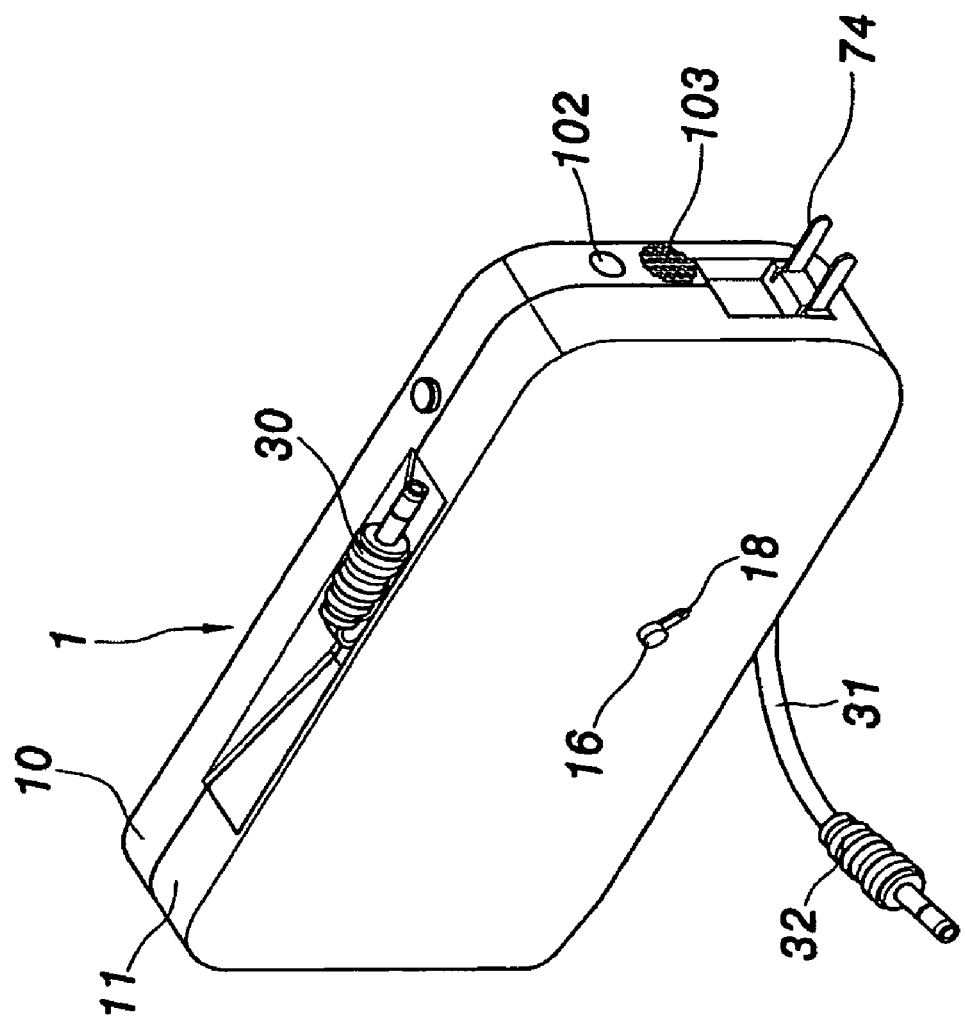
FIG. 1 is a perspective view of the present invention.

Turning now to the drawings, FIGS. 1 to 5 show a cord reel box with recharging unit. The cord reel box with recharging unit comprises a housing 1, a rotating plate 2, a communication cord 3, a recharging unit 4, a PCB 7, and a pressing device 8. The housing 1 has a first half-housing 10, and a second half-housing 11 connecting with the first half-housing 10 to form with a cavity 12 therein. A pivoting shaft 13 is disposed in the cavity 12 of the housing 1. A cord slot 14 is formed in the pivoting shaft 13, and a cord outlet 15 is formed on one side of the housing 1. The PCB 7 is mounted in the housing 1 and adjacent to the recharging unit 4.

The rotating plate 2 has a pivoting hole 20 for being pivotally mounted on the pivoting shaft 13, a first and a second rings 21, 22 respectively formed on two sides of the rotating plate 2. A volute spring 6 is arranged between the housing 1 and the rotating plate 2 for urging the rotation of the rotating plate 2. The volute spring 6 is formed with a hooking end 60. The first ring 21 has an engaging cutout 23 formed thereon for engaging with the hooking end 60 of the volute spring 6. The second ring 22 is formed with a pair of slits 24.

The communication cord 3 is composed of four or six conductive wires. One end of the communication cord 3 passes through the cord slot 14 of the pivoting shaft 13 and connecting with the PCB 7. The communication cord 3 is wound on the pivoting shaft 13 with plural circles and passes through the slit 24 of the second ring 22 for being wound on the second ring 22, and then the communication cord 3 extends outside the cord outlet 15 of the housing 1.

The two ends of the communication cord 3 connect with various devices according to practical needs, such as socket, connector, earphone, microphone, or other device. As shown in the FIG. 2, one end of the communication cord 3 connects with a first connector 30, and the other end connects with the PCB 7. The PCB 7 connects with a second connector 32 via a section of connecting cord 31; therefore, the two ends of the communication cord 3 are respectively connecting with the first connector 30 and the second connector 32. The first and second connectors 30, 32 can be various kind of connectors, plugs, or adapters. The adapter can connect two different types of connector for extending use.

According to the mentioned above, the cord reel box can be manufactured. The operation of the cord reel box is suitable to receive a predetermine length of the communication cord 3. The a relevant communication device can be plugged into second connector 32. The communication cord 3 can extend from the end of the first connector 30. The volute spring 6 can urge the rotation of the rotating plate 6 for winding back the communication cord 3 for avoiding entanglement.

For avoiding the tension of the volute spring 6 affecting the user while dragging the communication cord 3, the rotating plate 2 has a plurality of stuck notches 25 formed on a periphery thereof, a pawl 26 swinging in the stuck notches 25, and a ratchet wheel 27 acting with the pawl 26. The communication cord 3 is thus fixed or extendable between dragging and releasing.

The recharging unit 4 is mounted in the housing 1. The recharging unit 4 has a gear mechanism 40, a regenerator 41 and an accumulator 42. The gear mechanism 40 is assembled between the rotating plate 2 and the regenerator 41. The motivational force of the rotating plate 2 during rotation will pass to the regenerator 41 via the gear mechanism 40. The gear mechanism 40 comprises a first gear 43, a second gear 44, a third gear 45, a fourth gear 46, a fifth gear 47, a sixth gear 48, and a seventh gear 49. The first gear 43 is disposed at one side of the rotating plate 2, and the second gear 44 is disposed at one side of the first gear 43. The first and second gears 43, 44 are co-axially and pivotally mounted on the pivoting shaft 13. The third gear 45 and the fourth gear 46 are formed integrally and co-axially and pivotally mounted on a first stem 16, which is disposed in the housing 1 for rotating simultaneously. The first gear 43 is engaged with the third gear 45, so that the motivational force is passed to the third gear 45 and the fourth gear 46 via the first gear 43.

The fifth gear 47 and the sixth gear 48 are formed integrally and are co-axially and pivotally mounted on a second stem 17, which is disposed in the housing 1 for rotating simultaneously. The fourth gear 46 is engaged with the fifth gear 47, so that the motivational force is passed to the fifth gear 47 and the sixth gear 48 via the first gear 43, the third gear 45 and the fourth gear 46. The generator 41 is fixed in the housing 1. The seventh gear 49 is assembled on a power shaft 50 of the generator 41 and engaged with the sixth gear 48, so that the motivational power is passed to the seventh gear 49 and drives the generator 41 via the sixth gear 48. The generator 41 connects with the accumulator 42 and the PCB 7 via a connecting cord, so that the electric power can transmit from the generator 41 to the accumulator 42 and the PCB 7.

Figure 5:
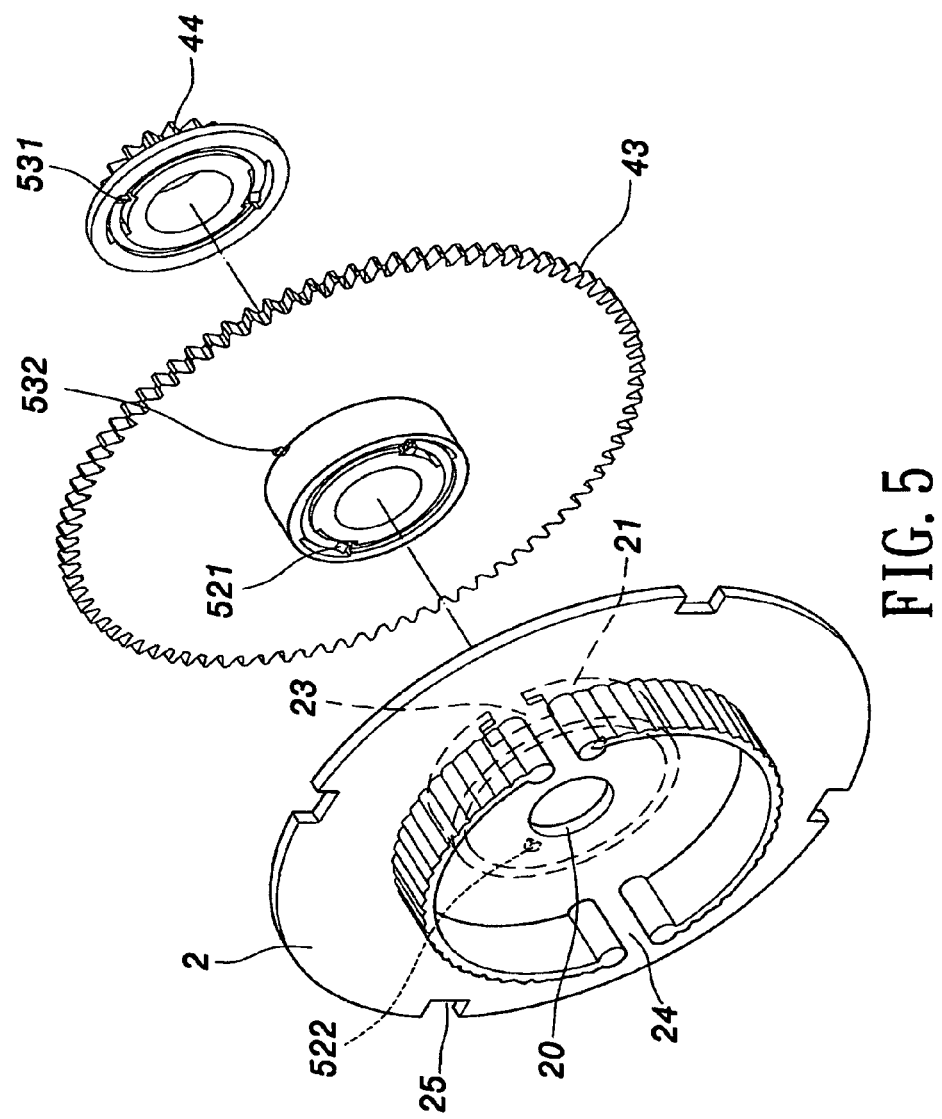
FIG. 5 is a perspective view of a portion of gear mechanism of the present invention.
Figure 6:
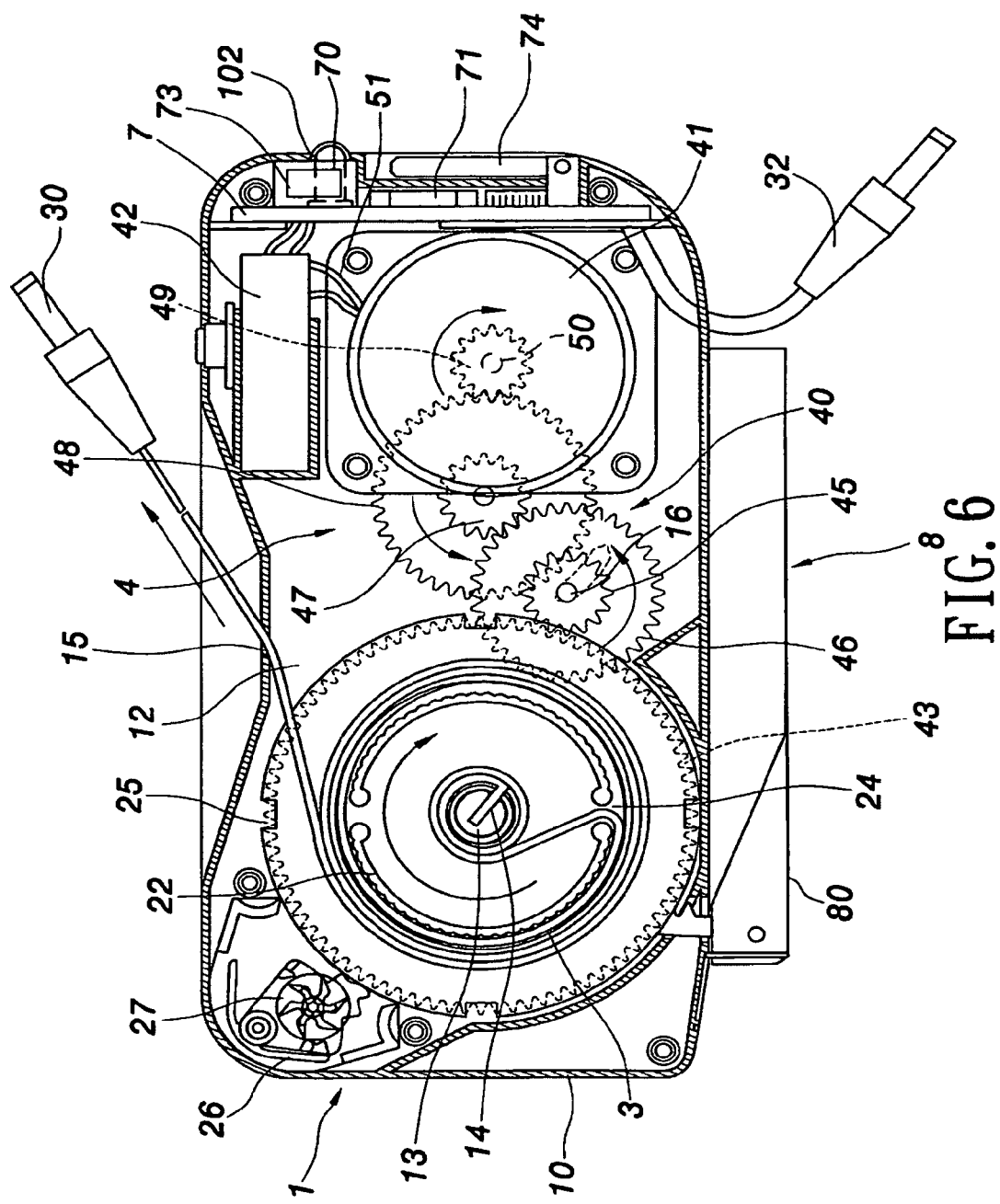
FIGS. 6 to 11 are perspective views of the present invention under different operating conditions.
Figure 12:
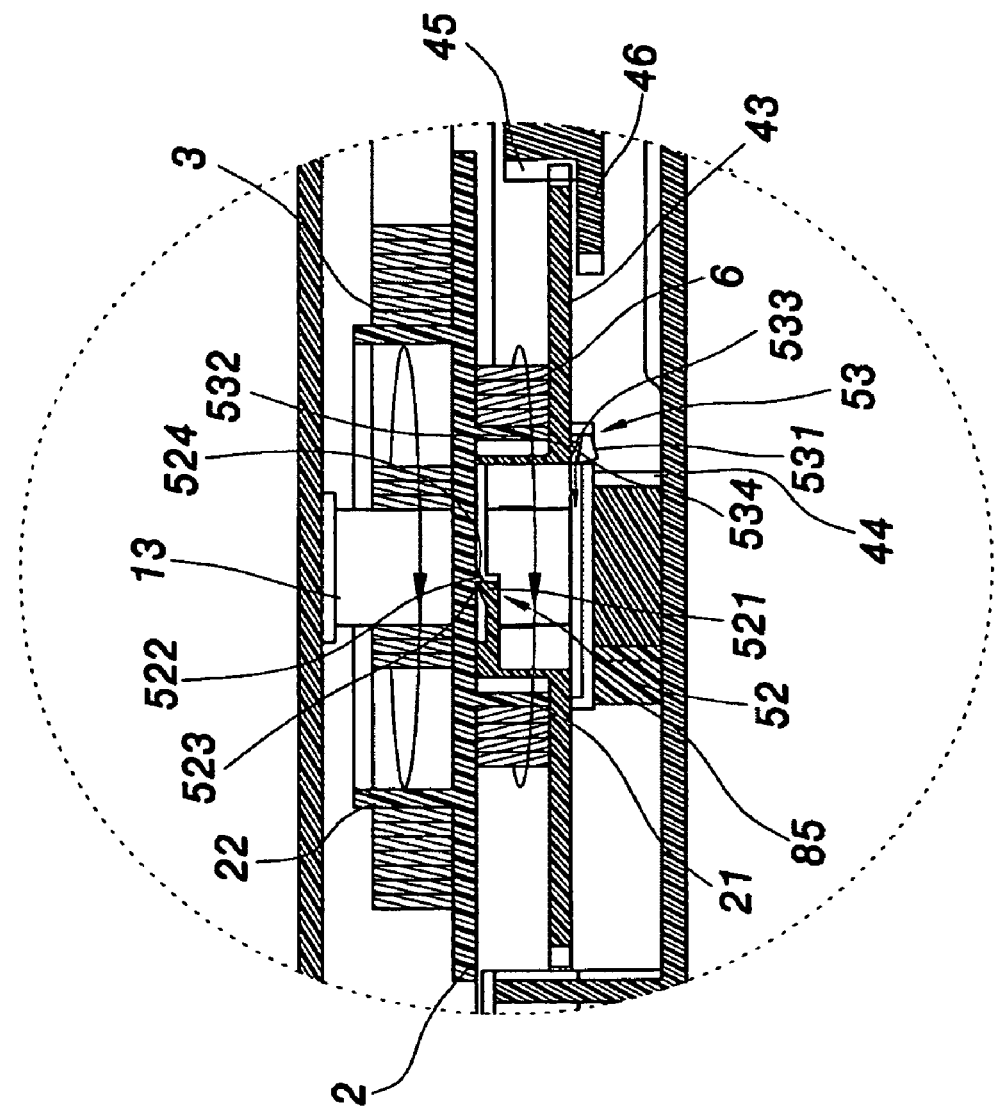
FIGS. 12 to 14 are cross-sectional views of one non-return mechanism of the present invention under different operating conditions.

FIGS. 5 and 12 more specifically illustrate first and second non-return mechanisms 52, 53. The first non-return mechanism 52 is assembled between the rotating plate 2 and the first gear 43. The first non-return mechanism 52 comprises plural claws 521 formed on one side of the first gear 43, and plural one-way stoppers 522 disposed on one side of the rotating plate 2. Each of the one-way stoppers 522 has a pushing surface 523 and an inclined sliding surface 524. The second non-return mechanism 53 is assembled between the first gear 43 and the second gear 44. The second non-return mechanisms 53 comprises plural claws 531 formed on one side of the second gear 44, and plural one-way stoppers 532 formed on another side of the first gear 43. Each of the one-way stoppers 532 has a pushing surface 533 and an inclined sliding surface 534.

Figure 8:
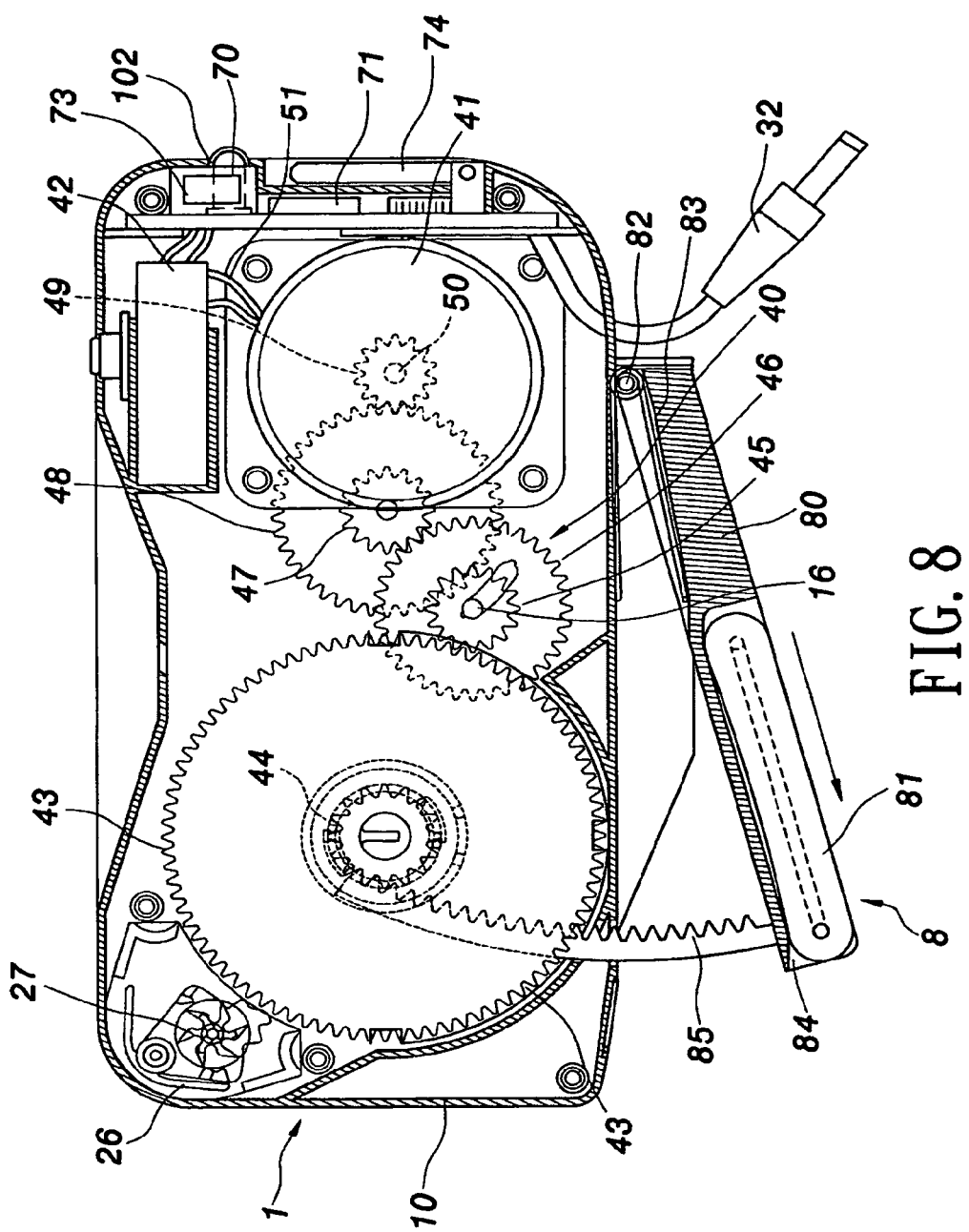

Referring to FIGS. 2, 8 to 11, the pressing device is illustrated in detail. The pressing device 8 is pivotally mounted on one side of the housing 1, and the gear mechanism 4 is assembled between the pressing device 8 and the regenerator 41. The pressing device 8 comprises a handle 80 formed with a receiving space 84, a folding portion 81 received in the receiving space 84, an elastic element 83 installed between the handle 80 and the housing 1, and an arc rack 85 connected on an inside surface of the handle 80. The handle 80 is pivotally mounted on one side of the housing 1 via a pivoting rod 82. The arc rack 85 is engaged with the second gear 44 of the gear mechanism 4, as shown in FIG. 8. The folding portion 81 is stretchable from the receiving space 84. The handle 80 further comprises a positioning groove 86 formed thereon, and a positioning ring 87 pivotally mounted on one side of the housing 1. The positioning ring 87 can clip in the positioning groove 86 for leaning the pressing device 8 against the housing 1 when not using the pressing device 8.

Referring to FIGS. 6 to 12, the operating conditions of the present invention are shown. When the communication cord 3 is dragged from the cord reel box, the rotating plate 2 drives the first gear 43 of the gear mechanism 40. The motivational power passes to the first gear 43, the third gear 45, the fourth gear 46, the fifth gear 47, the sixth gear 48, and the seventh gear 49, and then drives the generator 41 for generating electric power and storing to the accumulator 42. When the rotating plate 2 turns clockwise, the claws 521 on the first gear 43 pushes the pushing surface 523 of the one-way stopper 522 on the rotating plate 2. So the rotating plate 2 can drive the first gear 43 simultaneously, and the motivational power is passed to the generator 41 via the first gear 43, the third gear 45, the fourth gear 46, the fifth gear 47, the sixth gear 48, and the seventh gear 49. At the same time, the claws 531 on the second gear 44 are against to the sliding surface 534 of the one-way stopper 532 on the first gear 43. Therefore the motivational power of the rotating gear 43 is not passed to the second gear 44, the second gear 44 is only driven by the pressing device 8.

Figure 2:
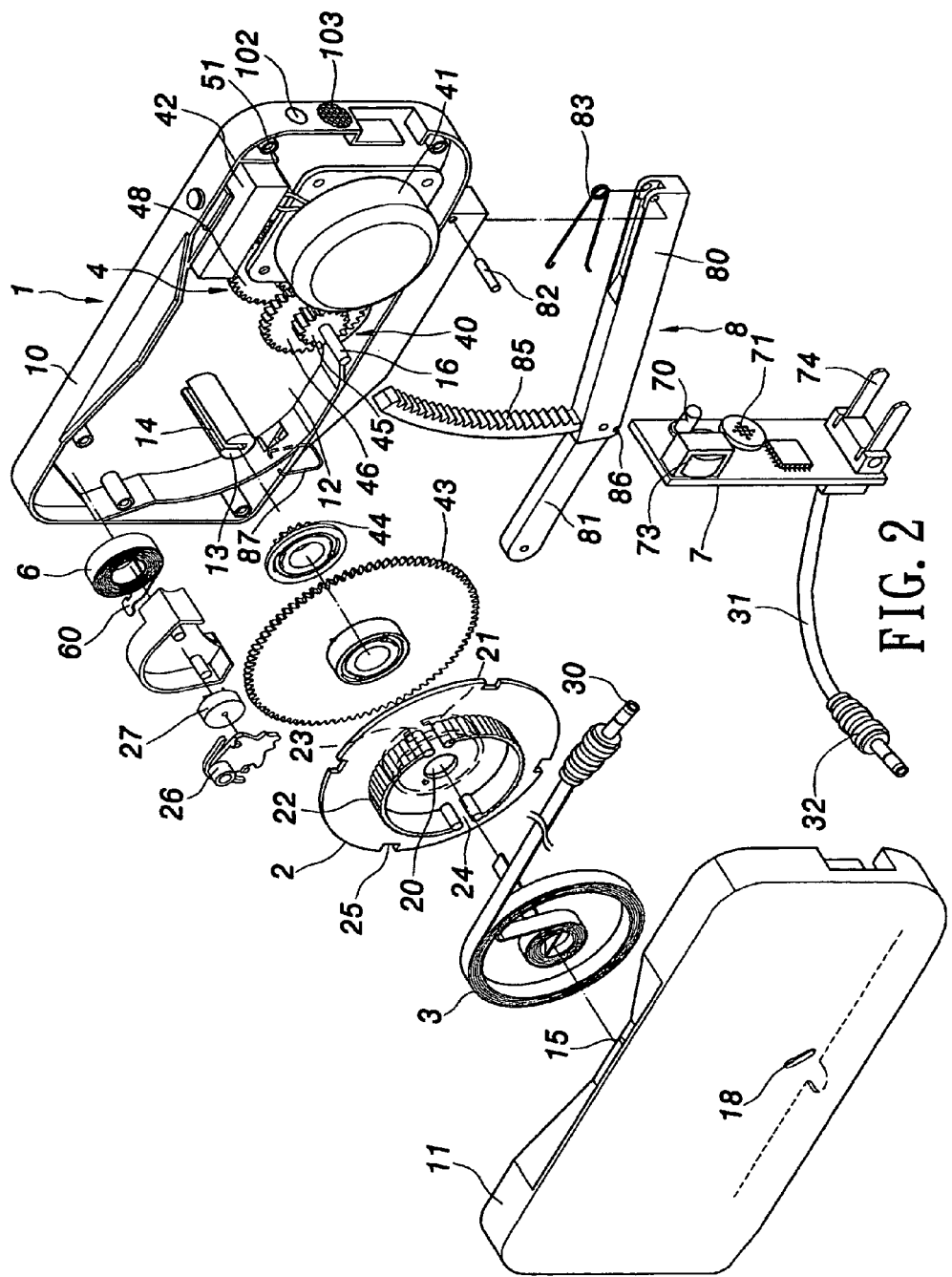
FIG. 2 is a perspective exploded view of the present invention.
Figure 3:
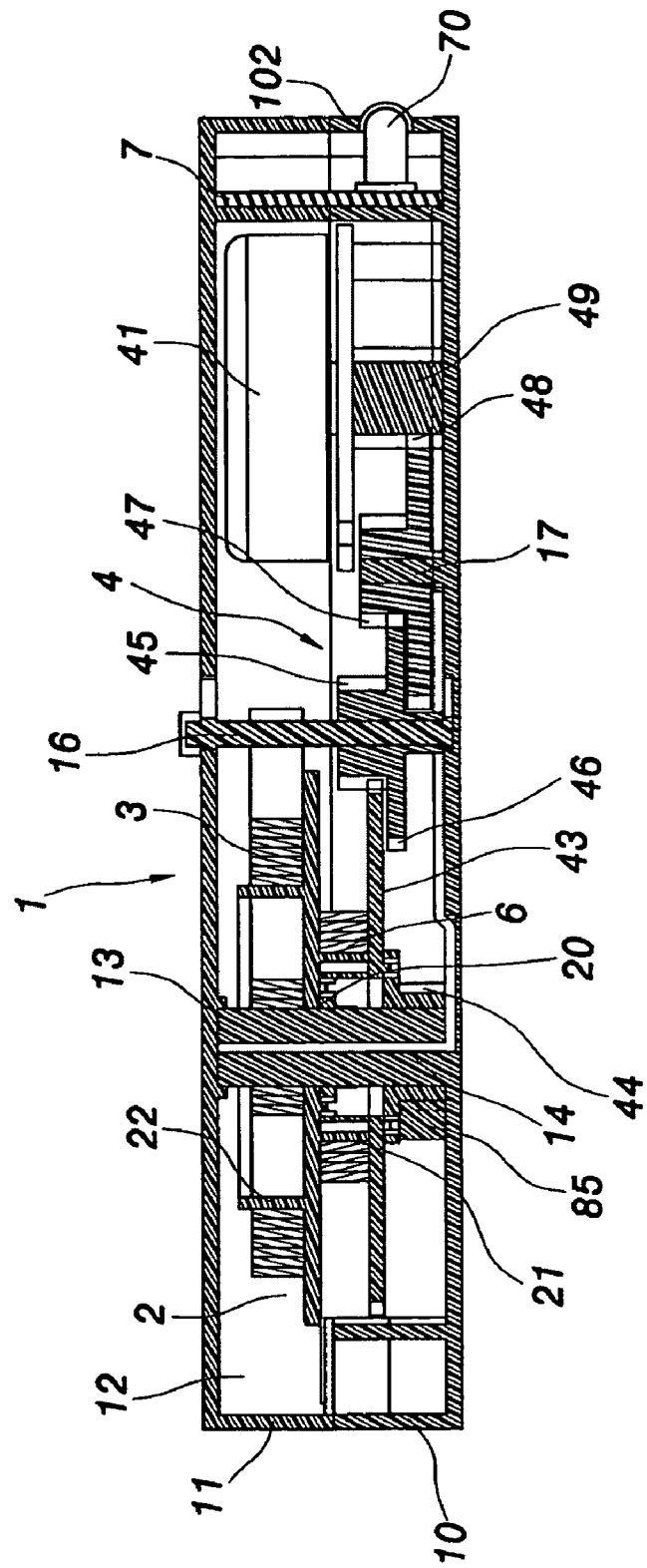
FIG. 3 is a cross-sectional side view of the present invention.
Figure 4:
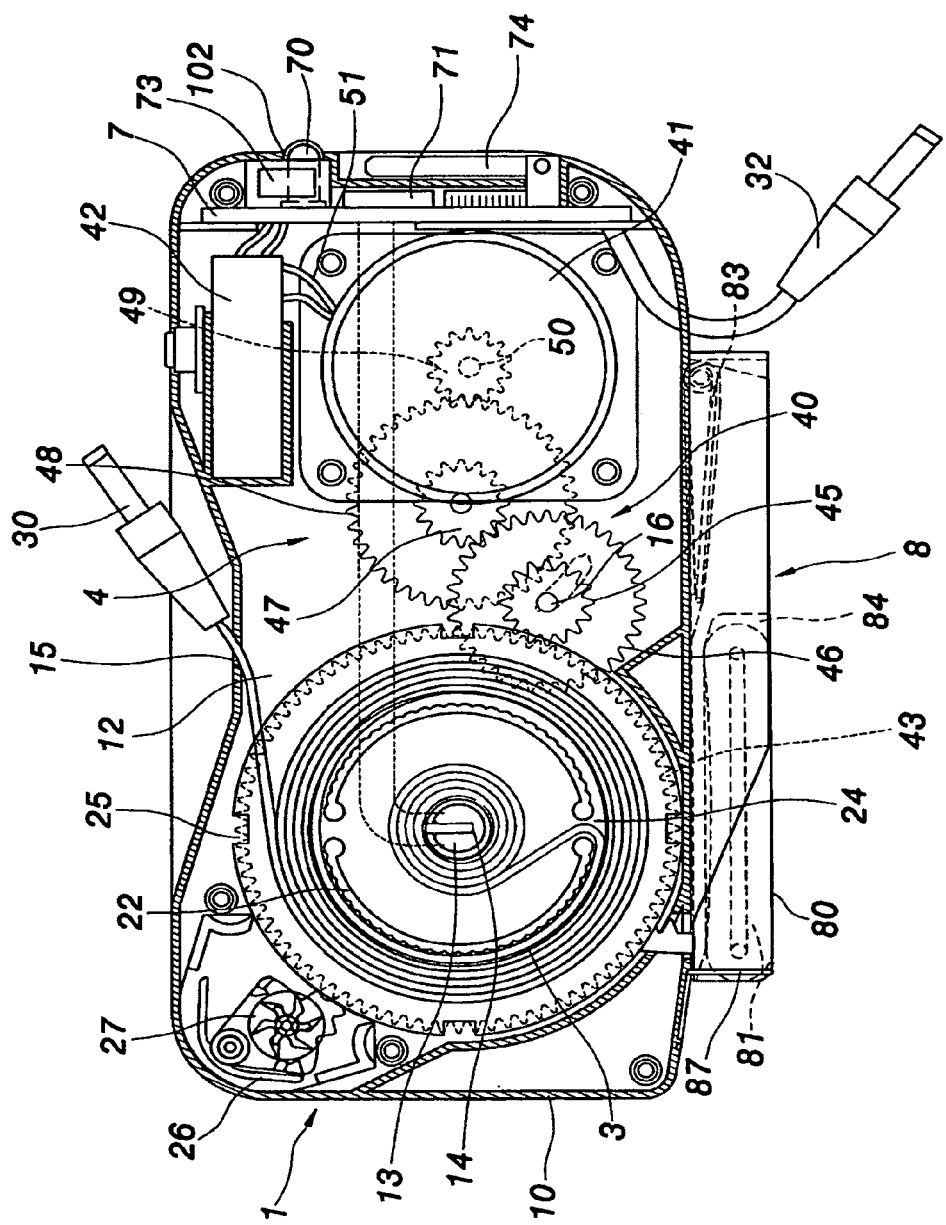
FIG. 4 is a cross-sectional top view of the present invention.
Figure 7:
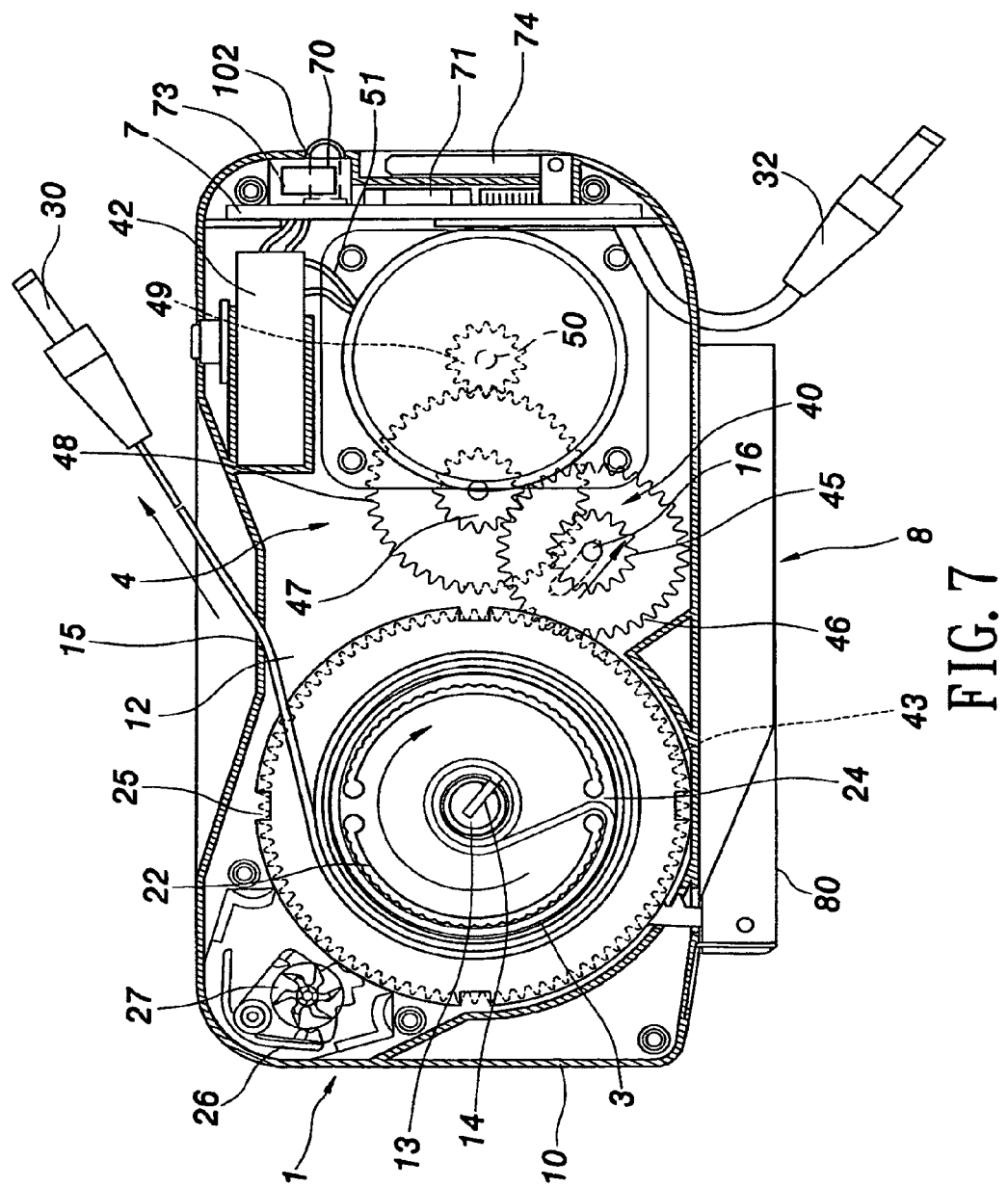

As shown in FIGS. 2 and 7, the third gear 45 and the fourth 46 are moveable for switching to drive the generator 41 or not. The housing 1 has a pair of switching channels 18 formed on two sides thereof, and the two ends of the first stem 16 are slidably mounted in the switching channels 18. The third gear 45 is alternatively engaged with the first gear 43 or not by sliding in the switching channels 18. When the third gear 43 is engaged with the first gear 43, the motivational power will pass to the first gear 43, the third gear 45, the fourth 46, the fifth gear 47, the sixth gear 48, and the seventh gear 49, then drive the generator 41. When the third gear 43 is not engaged with the first gear 43, the motivational power will not pass to the generator 41. The generator 41 will not generate electric power, and the cord reel box is only use to rewind the cord.

Figure 13:
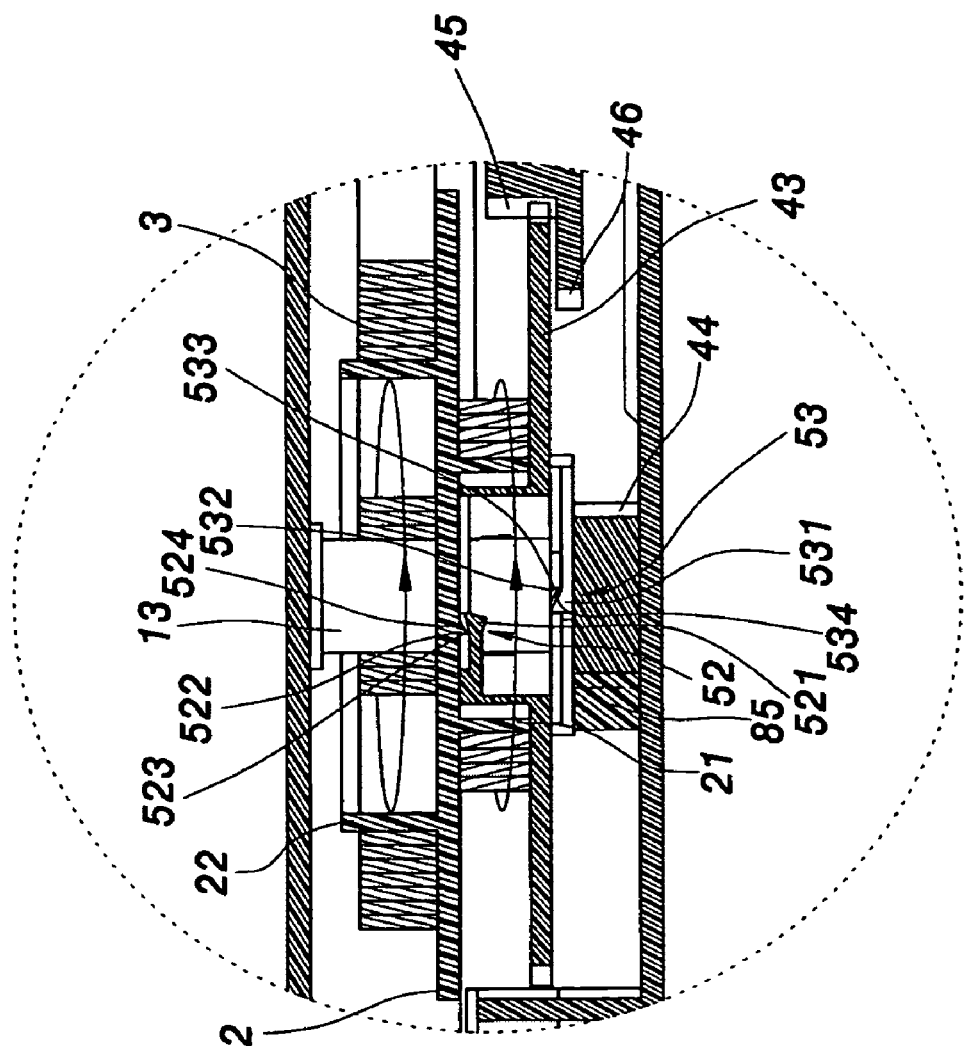

Turning to FIG. 13, the communication cord 3 is affected by the volute spring 6 and has a drawing-back force. The volute spring 6 urges the rotating plate 2 to turn anti-clockwise, so that the communication cord 3 can be rewound into the cord reel box. When the rotating plate 2 turning anti-clockwise, the plural claws 521 on the first gear 43 are against the sliding surface 524 of the one-way stopper 522 on the rotating plate 2, so that the motivational power passes to the first gear 43. When the rotating plate 2 turns anti-clockwise, the motivational power is interrupted and not passes to the first gear 43 for avoiding reversing the generator 41 and protecting the generator 41.

Figure 9:
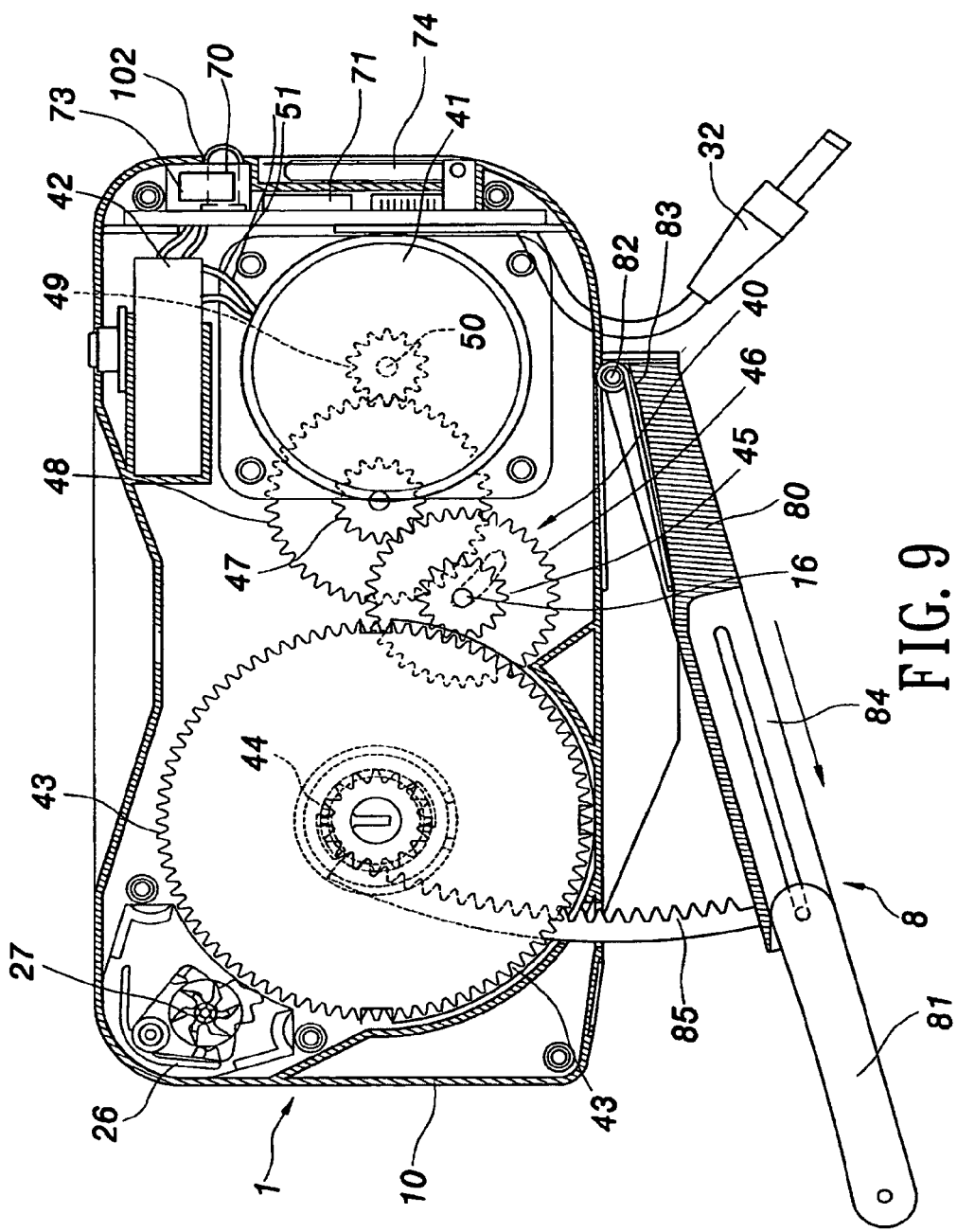
Figure 10:
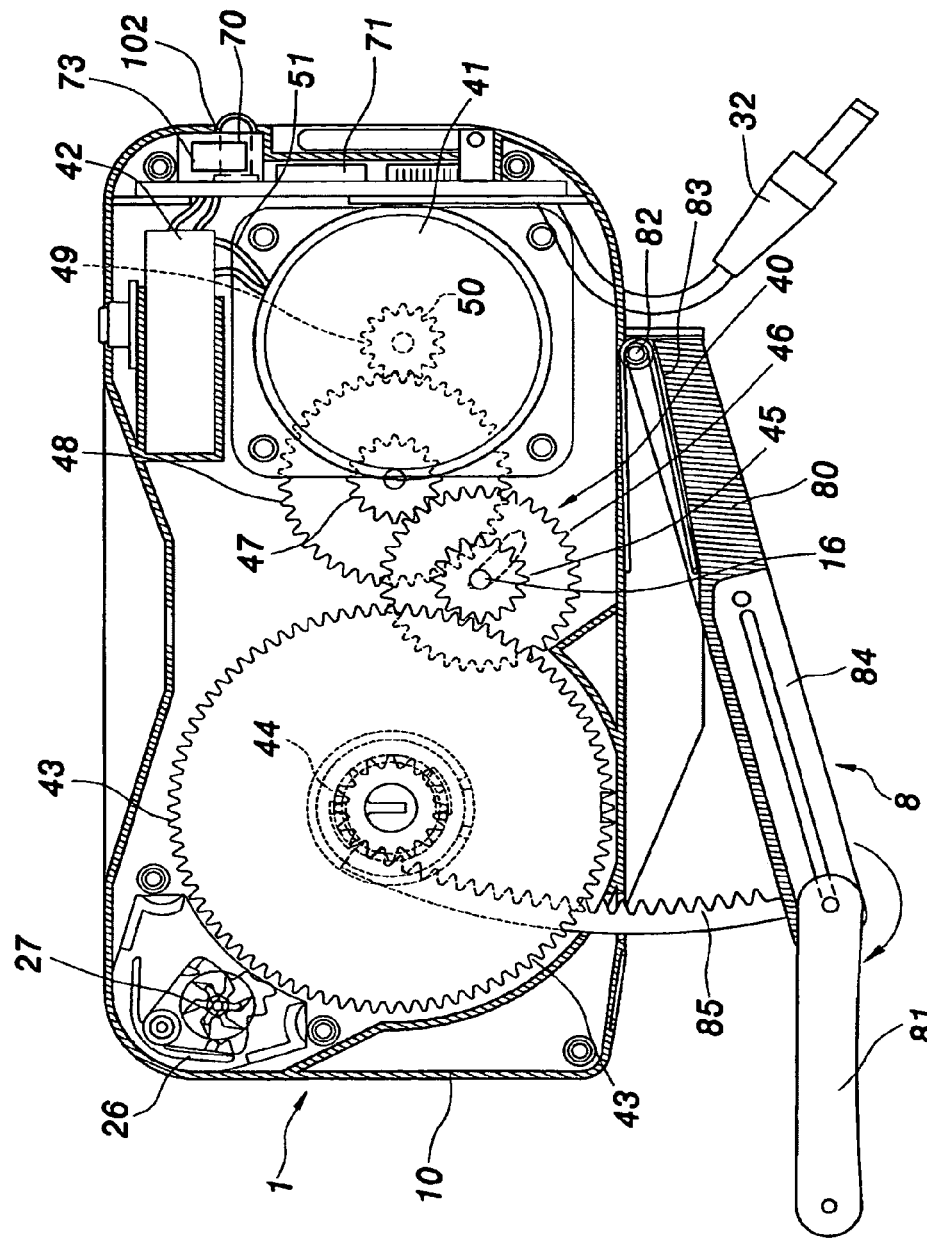
Figure 11:
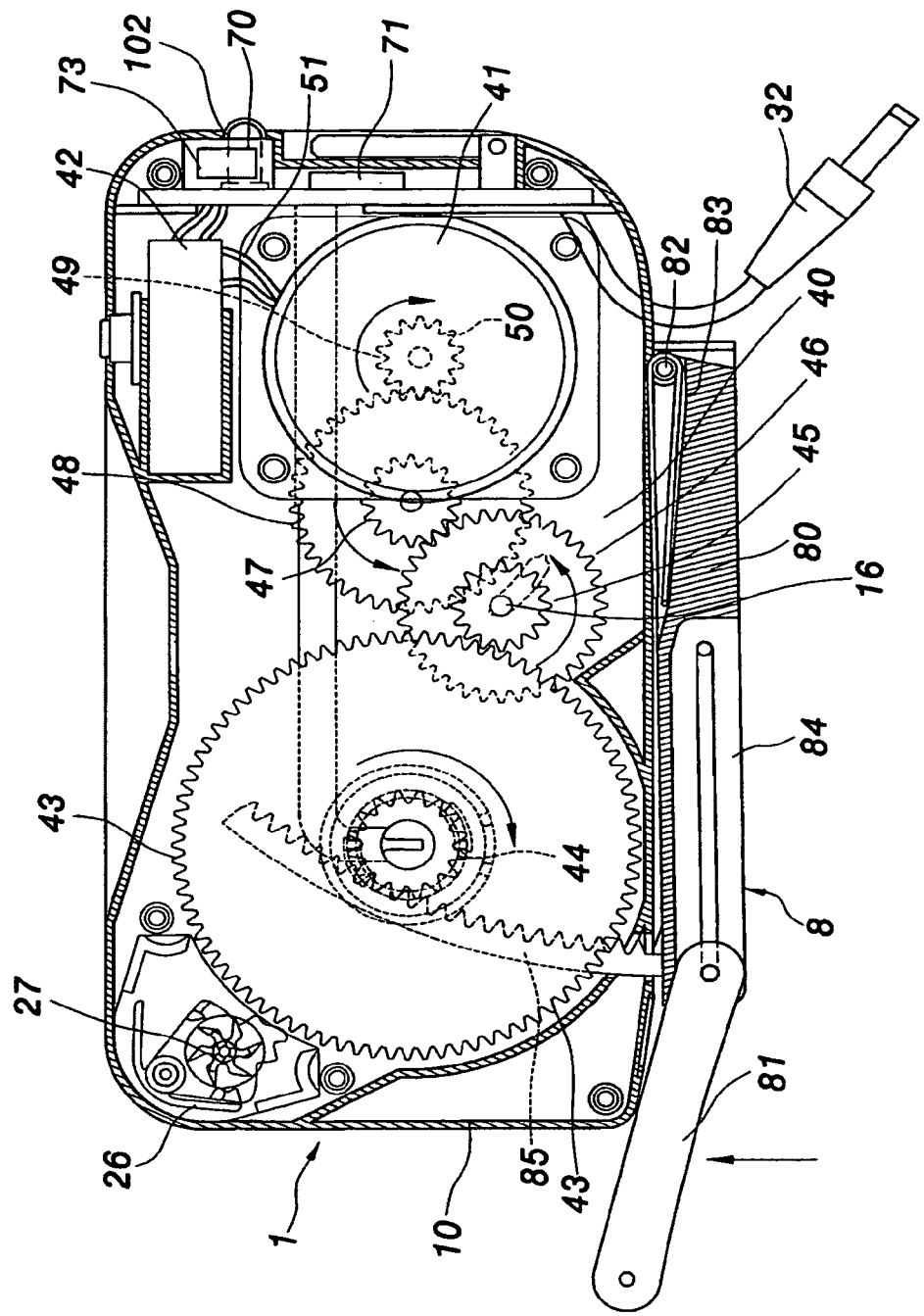

Referring to FIGS. 8 to 11, the pressing device 8 can drive the generator 41 via the gear mechanism 4. Pivoting on the pivoting rod 82, as shown in FIG. 8, can pull the handle 80 outside. Stretching the folding portion 81 outside to form a longer handle composed by the folding portion 81 and the handle 80, as shown in FIG. 9. Pressing inwardly the folding portion 81 and the handle 80, as shown in FIG. 10. Then the rack 85 urges the rotation of the second gear 44, as shown in FIG. 11, and the first gear 43 turns simultaneously. The motivational power passes to the third gear 45, the fourth gear 46, the fifth gear 47, the sixth 48, and the seventh gear 49, then to drive the generator 41.

Figure 14:
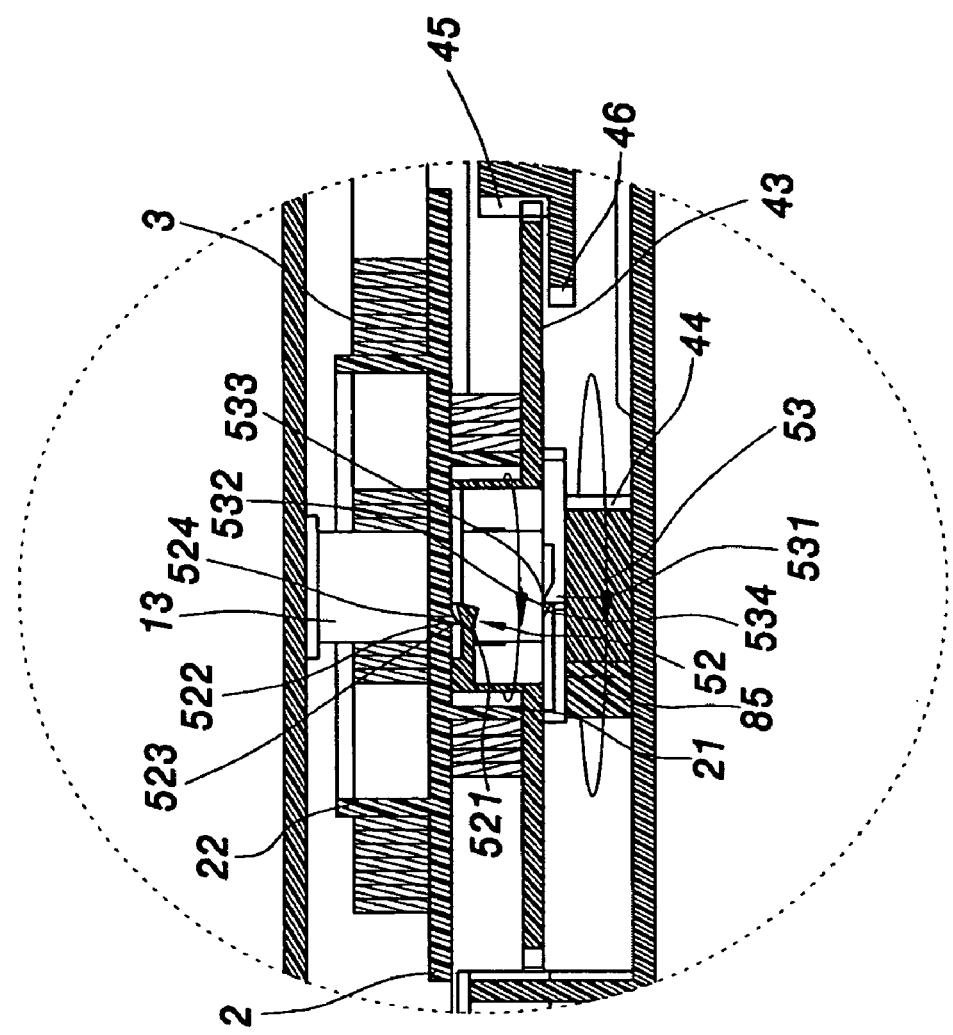

Referring to FIGS. 11 and 14, a mechanism to prevent the generator reversing during pressing the pressing device is shown. When pressing the pressing device 8, the rack 85 urges the second gear 44 turning clockwise. The claws 531 on the second gear 44 are against the pushing surface 533 of the one-way stopper 532 on the first gear 43, and drives the first gear 43 to turn simultaneously. When the second gear 44 turning anti-clockwise, the motivational power is interrupted and not passes to the first gear 43 for avoiding the generator 41 to reverse.

The present invention has advantages. The cord reel box can rewind the cord 3, and generate electric power while pulling the cord 3 to recharge, or generate electric power. The cord reel box can recharge a cell phone via the connector 32. The pressing device 8 also can drive the generator 41 for regenerating a great amount of electric power without pulling the cord 3.

The PCB 7 in the cord reel box can change the electric power from the generator 41 to different voltages and electric currents. The PCB 7 further comprises a light-emitting element 70, such as an LED, or a light bulb for illumination, and a beeper 71, such as a buzzer or a speaker for alerting or serving as a radio. The housing 1 further comprises a light hole 102, and a sound hole 103 mating with light-emitting element 70 and the beeper 71.

An AC plug 74 is pivotally mounted on the housing 1 and electrically connected with the PCB 7 and the communication cord 3. The AC plug 74 can extend outside or be received in the housing 1. The PCB 7 has a transformer 73 mounted thereon for transforming the electric power from the AC plug 74 to a proper voltage and current. Thereby the cord reel box can be conveniently used indoor.

Figure 15:
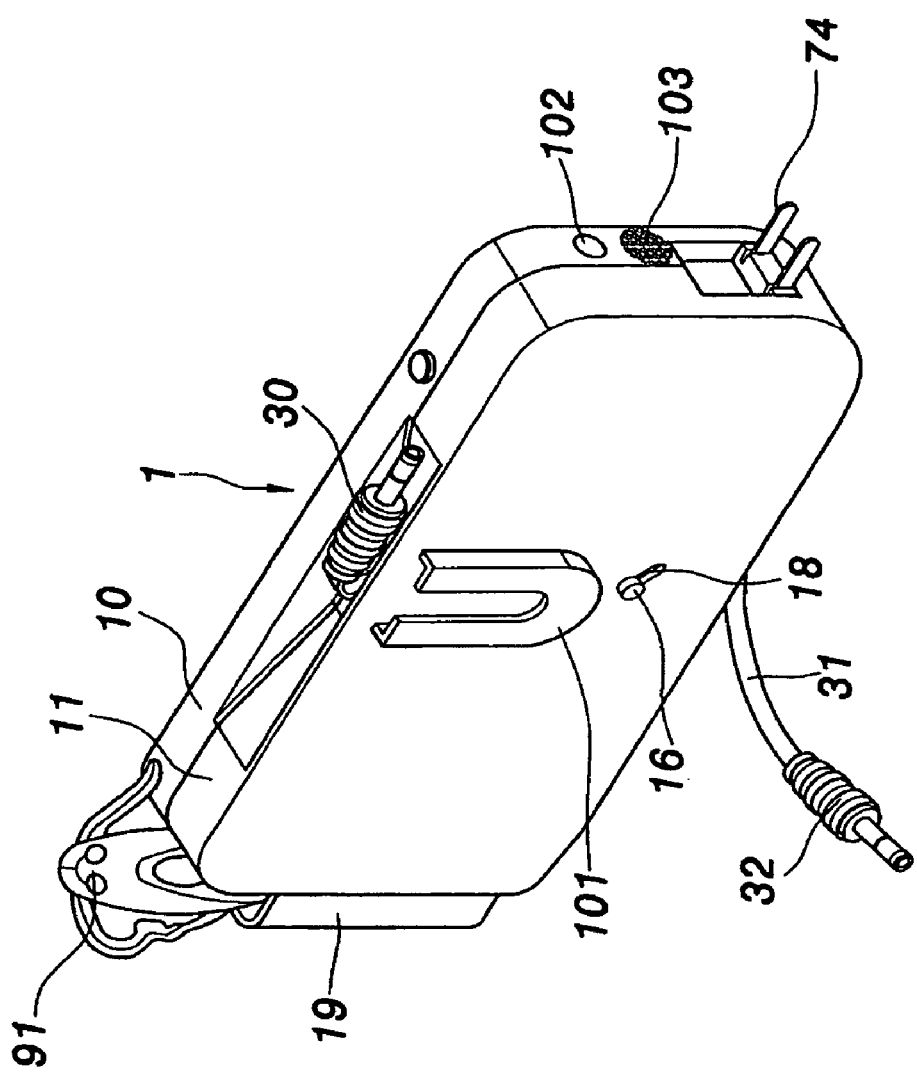
FIG. 15 is a perspective view of a second embodiment of the present invention.
Figure 16:
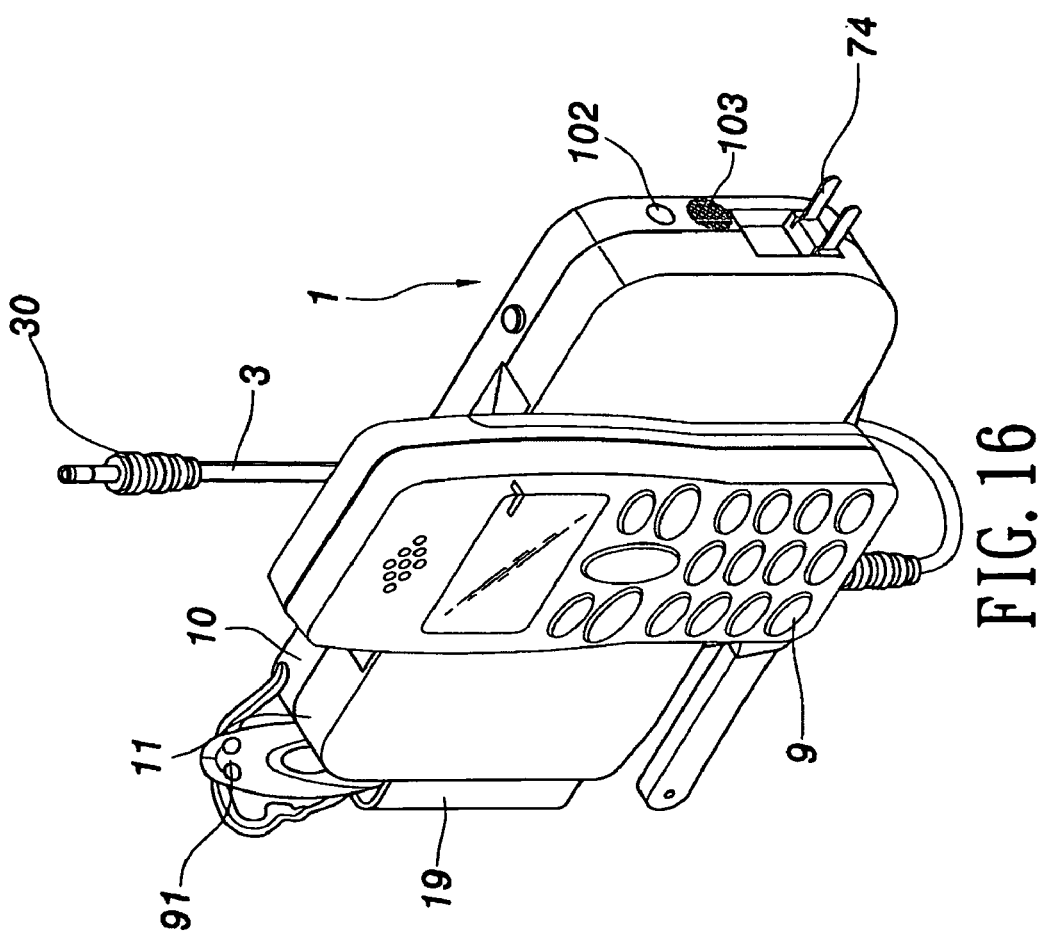

As shown in FIGS. 15 and 16, the housing 1 is formed with a storage groove 19 and an engaging device 101 on an outside thereof. The storage groove 19 can store something, such as an earphone. The engaging device 101 can engage with a cell phone 9.

Figure 17:
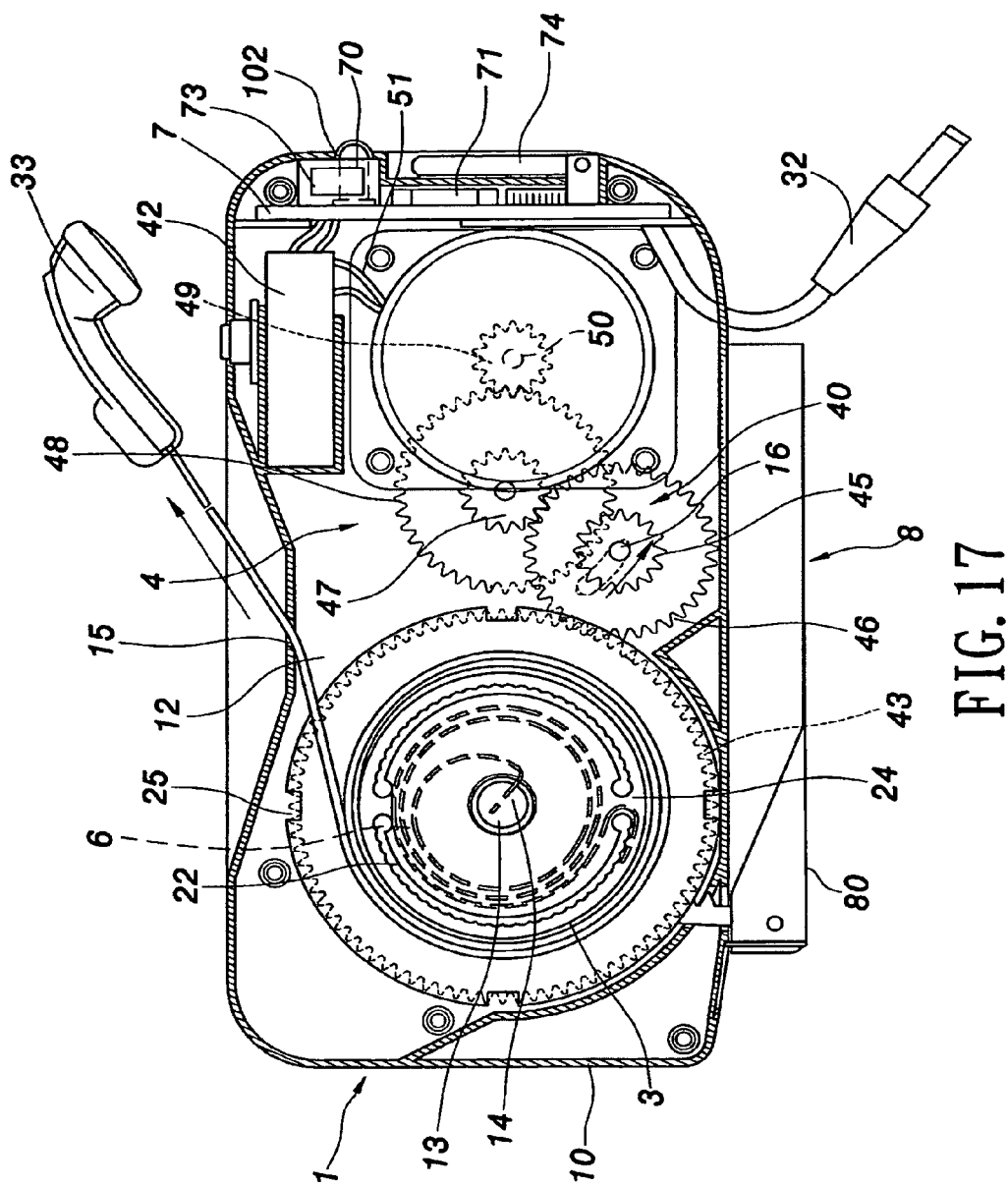
FIG. 17 is a cross-sectional view of one spring of another embodiment of the present invention.

As shown in FIG. 17, the volute spring 6 can be a flat spring, which is received in the rotating plate 2. The communication cord 3 is connected with an earphone 33.

The sum up of the characters and advantages are as follows. The charging cradle is replaceable, and just by designing and replacing the charging cradle according to various mating connector of digital electronic products. The factory does not need develop molds again so as to waste resources, and sometimes delays the development time, especially important when considering the short period of the digital electronic product such as, for example, a cell phone.

What is claimed is:

1. A cord reel box with recharging unit, comprising:
  a housing formed with a cavity therein;
  a rotating plate pivotally mounted in the cavity;
  a volute spring arranged between the housing and the rotating plate;
  a communication cord being wound in the rotating plate, one end of the communication cord passing through the housing;
  a recharging unit mounted in the housing, having a gear mechanism and a regenerator, the gear mechanism assembled between the rotating plate and the regenerator;
  a pressing device pivotally mounted on one side of the housing, and the gear mechanism assembled between the pressing device and the regenerator; and
  an AC plug mounted on the housing and electrically connecting with a PCB disposed in the housing, the PCB having a transformer mounted thereon, and the communication cord electrically connecting with the PCB;
  whereby when the communication cord is pulled, the rotating plate rotates and drives the regenerator via the gear mechanism for producing electric power, when the pressing device is pressed, the pressing device drives the regenerator via the gear mechanism for producing electric power, and electric power is input via the AC plug.

2. The cord reel box with recharging unit as claimed in the claim 1, wherein the housing has a first half-housing, a second half-housing connecting with the first half-housing, a pivoting shaft disposed in the cavity of the housing, a cord slot formed on the pivoting shaft, and a cord outlet formed on one side of the housing, wherein the rotating plate has a pivoting hole pivotally mounted on the pivoting shaft, a first and a second rings respectively formed on two sides of the rotating plate, and wherein the first ring is formed with an engaging cutout for engaging with a hooking end of the volute spring, one end of the communication cord passes through the cord slot of the pivoting shaft and is wound on the pivoting shaft and on the second ring, and extends outside the cord outlet of the housing.

3. The cord reel box with recharging unit as claimed in the claim 1, wherein the housing is formed with a storage groove and an engaging device on an outside thereof.

4. The cord reel box with recharging unit as claimed in the claim 1, wherein the recharging unit further comprises an accumulator, and the generator connects with the accumulator via a connecting cord.

5. The cord reel box with recharging unit as claimed in the claim 1, wherein the pressing device comprises a handle formed with a receiving space therein and pivotally mounted on one side of the housing via one end thereof, a folding portion is received in the receiving space, an elastic element is installed between the handle and the housing, an arc rack is connected on an inside surface of the handle and engaged with the gear mechanism, and the folding portion is stretchable from the receiving space.

6. The cord reel box with recharging unit as claimed in the claim 1, wherein the gear mechanism comprises a first gear for driving the rotating plate and a second gear coaxially disposed on one side of the first gear, and wherein a first non-return mechanism is installed between the housing and the first gear, and a second non-return mechanism is installed between the first gear and the second gear.

7. The cord reel box with recharging unit as claimed in the claim 1, wherein the gear mechanism comprises a third gear formed with a stem, the stem is slidably installed in a switching channel of the housing, and the third gear is thereby detachably engaged with the first gear.

8. The cord reel box with recharging unit as claimed in the claim 1, wherein the communication cord is connected with a connector.

9. The cord reel box with recharging unit as claimed in the claim 1, wherein the communication cord is connected with an earphone.

10. The cord reel box with recharging unit as claimed in the claim 1, wherein the volute spring is a flat spring.

11. The cord reel box with recharging unit as claimed in the claim 1, wherein the volute spring is installed in the rotating plate.

* * * * *